United States Patent [19]
Finch et al.

[11] 3,888,731
[45] June 10, 1975

[54] MODULAR CORE COMPONENT SUPPORT FOR NUCLEAR REACTOR

[75] Inventors: Lester M. Finch; Andy J. Anthony, both of Pasco, Wash.

[73] Assignee: The United States of America as represented by the United States Energy Research and Development Administration, Washington, D.C.

[22] Filed: Mar. 15, 1973

[21] Appl. No.: 341,612

[52] U.S. Cl. .................. 176/50; 176/43; 176/61; 176/38; 176/87
[51] Int. Cl. ........................................... G21c 15/00
[58] Field of Search ............ 176/50, 61, 37, 38, 87, 176/68, 43

[56] References Cited
UNITED STATES PATENTS

| | | | |
|---|---|---|---|
| 3,200,045 | 8/1965 | Vendryes et al. | 176/61 |
| 3,235,465 | 2/1966 | McDaniel et al. | 176/61 |
| 3,238,105 | 3/1966 | McNelly | 176/37 |
| 3,285,825 | 11/1966 | Jens | 176/68 |
| 3,383,287 | 5/1968 | Jackson | 176/50 |
| 3,401,081 | 9/1968 | Menzel et al. | 176/50 |
| 3,506,540 | 4/1970 | Yerick et al. | 176/87 |
| 3,619,367 | 11/1971 | Gumuchian | 176/61 |
| 3,666,624 | 5/1972 | Finch et al. | 176/50 |
| 3,736,226 | 5/1973 | Sakurama | 176/50 |
| 3,763,886 | 10/1973 | Lambert | 176/61 |

*Primary Examiner*—Harvey E. Behrend
*Attorney, Agent, or Firm*—Dean E. Carlson; Arthur A. Churm; Hugh W. Glenn

[57] ABSTRACT

The core of a nuclear reactor is made up of a plurality of support modules for containing components such as fuel elements, reflectors and control rods. Each module includes a component support portion located above a grid plate in a low-pressure coolant zone and a coolant inlet portion disposed within a module receptacle which depends from the grid plate into a zone of high-pressure coolant. Coolant enters the module through aligned openings within the receptacle and module inlet portion and flows upward into contact with the core components. The modules are hydraulically balanced within the receptacles to prevent expulsion by the upward coolant forces.

3 Claims, 2 Drawing Figures

3,888,731

MODULAR CORE COMPONENT SUPPORT FOR NUCLEAR REACTOR

CONTRACTUAL ORIGIN OF THE INVENTION

The invention described herein was made in the course of, or under, a contract with the U.S. Atomic Energy Commission.

BACKGROUND OF THE INVENTION

This invention relates generally to the manner in which core components are mounted and arranged within a nuclear reactor. A more detailed application is the support of components within liquid-metal-cooled fast breeder reactors in which coolant flow and pressure differences may impose large upward forces on the components.

Nuclear reactors often include a plenum for supplying high-pressure coolant to fuel element assemblies and other reactor components mounted on a grid plate. The coolant is collected within a low-pressure plenum for recirculation. The upward flow of coolant, pressure difference and the buoyancy effect of displaced coolant may exert sufficient force to lift the reactor components from their rest positions. Where this is expected to occur, mechanical holddown devices have been employed to secure the individual components. However, such devices are often cumbersome and add to the reactor cost. During refueling or other component replacement these holddown devices must be disconnected either to remove the attached component or to gain access to other portions of the core. Fast breeder reactors, in particular, are of close construction, thus making it difficult to reach internal parts without disconnecting and removing intervening members. During such operations, extreme precautions or additional provisions must be made to prevent expulsion of individual fuel elements or control rods should the coolant flow become blocked or begin to pulsate.

Furthermore, rearrangement of the reactor core lattice is made more difficult when components are individually secured within the core by mechanical means. This is particularly undesirable in test and demonstration reactors where relatively frequent core lattice modifications are needed to accommodate various test programs.

SUMMARY OF THE INVENTION

Therefore it is an object of the present invention to provide a nuclear reactor core assembly having an improved core component support and coolant flow arrangement.

It is also an object to provide a reactor core assembly including replaceable core-component modules that are easily removed and installed.

It is a further object to provide such replaceable modules with which there is minimal risk of component expulsion from the reactor core.

According to the present invention, a grid plate for mounting core components separates a low-pressure from a high-pressure zone within a nuclear reactor. A plurality of module receptacles depend from the grid plate into the high-pressure zone and have side-wall openings for admitting coolant flow. Each module includes a coolant inlet portion that is positioned within a module receptacle below the grid plate and a component support portion that extends above the grid plate. The component support portion includes socket means for receiving various core components and thereby permits core lattice modifications through module replacement. The module inlet portion closely fits within its receptacle at the side walls, but is spaced from the receptacle bottom to form a small coolant reservoir. A vent passageway interconnects the reservoir and the low-pressure zone above the grid plate. Consequently, only the lateral surfaces of the module inlet portion are exposed to the high-pressure coolant and the coolant forces on the lateral surface are axissymetrically balanced.

BRIEF DESCRIPTION OF THE DRAWINGS

The present invention is illustrated in the accompanying drawings wherein.

DESCRIPTION OF THE PREFERRED EMBODIMENT

Figure 1:
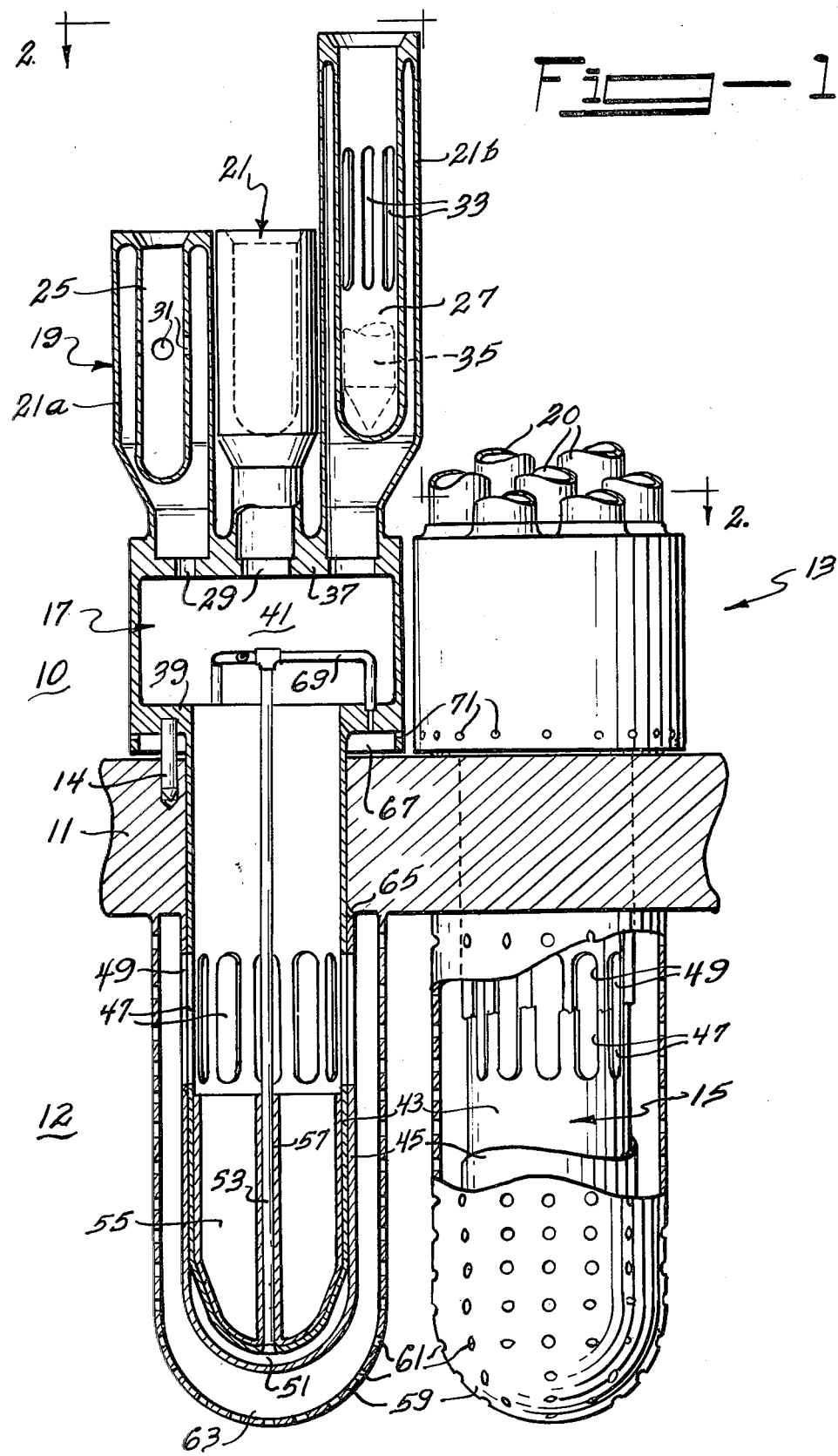
FIG. 1 is an elevational view partially in cross section and partially broken away of two modular units within a nuclear reactor core assembly.

Referring to the drawings, particularly FIG. 1, a grid plate 11 is shown separating a low-pressure coolant zone 10 from a high-pressure plenum or zone 12 within the core region of a nuclear reactor. A pair of core-component modules 13 are supported by the grid plate at about their central portions lengthwise. The modules are supported and aligned in respect to one another by removal dowel pins 14 which are snugly fitted into corresponding boreholes within the module and grid plate. Each module 13 includes a coolant inlet portion 15 penetrating through the grid plate into the high-pressure zone 12, a coolant-flow vestibule 17 disposed just above the grid plate in the low-pressure zone and a component support portion 19 extending above the coolant flow vestibule. It will be understood that, although only two modules are illustrated in FIG. 1, a nuclear reactor will ordinarily have a large number of separately replaceable modules within the core.

Component support portion 19 has a plurality of elongated sockets 21 each of which is adapted to receive a particular core component and thereby ensure correct component placement within the modules. Socket 21a is shown containing a relatively small-diameter receptacle part 25 coaxially supported at the top end of the socket. Similarly, socket 21b contains a relatively large-diameter receptacle part 27. These receptacle parts 25 and 27 can be individually used for receiving different reactor components, e.g. a neutron reflector or a fuel element containing fissile material, etc. For purposes of illustration, seven sockets are shown on each module; however, it will be clear that a greater or lesser number can be used as desired.

Each socket 21 includes a neck portion 20 attached to the coolant flow vestibule 17. The neck portions of the peripheral sockets in each module, for example sockets 21a and 21b, rather than being axially aligned with the respective socket members are offset inwardly along radial lines towards the module axis. This arrangement permits close assemblage of reactor components within the core as is required in fast breeder reactors.

Orifices 29 within the neck portions 20 are sized to admit an appropriate flow of coolant for the core component supported within each socket member 21. Other orifices 31 or slots 33 as shown in receptacle parts 25 and 27, respectively, direct the coolant flow into contact with the core component at right angles to minimize hydraulic forces tending to lift the component out of the receptacles. These openings may also be sized to restrict or regulate the coolant flow.

Receptacle 27 within socket 21b is illustrated as containing the nose piece 35 of a nuclear fuel element outlined in dotted lines. This nose piece can be provided with leakage flow vents extending longitudinally along the inside thereof to reduce the lifting effect of coolant entering the socket. The principles involved in this hydraulic holddown feature are clearly described and illustrated in applicants' prior U.S. Pat. No. 3,666,624 which issued May 30, 1972. Similar adaptations can be provided for use of this feature with core components other than fuel and target elements where necessary.

In between the grid plate 11 and the component support portion 19 of each module is a coolant flow vestibule 17. The vestibule includes an inner chamber 41 for distributing coolant to each of the socket members 21 through orifices 29. The upper 37 and lower 39 walls of the vestibule are of substantial thickness relative to the side walls thereof and the chamber is sized to contain a sufficient height of coolant for providing some neutron shielding above the grid plate. In this regard, the vestibules are closely clustered in an equilateral triangular pattern (see FIG. 2) such that a substantial portion of the upper grid plate surface is shielded from neutron flux by the coolant flow modules. Consequently, metal swelling resulting from neutron bombardment can be minimized.

Coolant inlet portion 15 is shown as an oblong vessel 43 extending through the grid plate into the high-pressure coolant zone 12. Vessel 43 is coaxially contained within a similarly shaped receptacle 45 depending from grid plate 11. In order to admit coolant flow, aligned openings 47 and 49 are provided in vessel 43 and receptacle 45 through their side walls just below the grid plate 11. Openings 47 and 49 are presented as elongated slots to illustrate one manner of admitting sufficient coolant flow at an acceptable pressure drop. The walls of vessel 43 and receptacle 45 are closely positioned without sealing at the sides, but are slightly spaced apart at the bottom surfaces to form a small coolant reservoir 51. A restricted or leakage flow of coolant passes between the vessel and receptacle walls into reservoir 51 from which it is discharged through a vent conduit 53 shown penetrating the bottom surface of vessel 43. Conduit 53 is of sufficient diameter to vent, at a small pressure differential all of the coolant flow which leaks into reservoir 51 to the low-pressure zone 10, thereby preventing high-pressure lifting forces from occurring beneath the module.

As thus described, the receptacle 45 and module 13 are so arranged that the coolant inlet portion 15 of the module, when fully inserted into receptacle 45, is exposed to high-pressure coolant only upon its lateral surfaces where the resultant forces are balanced axis-faces symetrically. The module is exposed to low-pressure coolant over its effective areas for axial force by reason of the low-pressure zone 10 above the grid plate 11 and from the partially sealed reservoir 51 formed between the closed lower end of the receptacle 45 and the coolant inlet portion 15, the reservoir 51 being vented to the low-pressure zone.

A crucible 55 constructed of a high-melting-point material such as tantalum is snugly fitted within the bottom portion of vessel 43. A central standpipe portion 57 having openings at both ends is also made of high-melting-point material as an integral portion of crucible 55. The standpipe closely receives vent conduit 53 and permits its passage into communication with reservoir 51. In the event of loss of coolant or control, melted components will be caught and contained within this primary meltdown section. A secondary meltdown section can be provided at the bottom of the reactor protective housing.

An oblong sheath 59 serving as a vortex suppressor is coaxially positioned over and spaced from the walls of receptacle 45, forming an elongated annular space 63 therebetween. Small perforations 61 are provided through the sheath wall over its entire surface for admitting coolant into the component modules. Gas bubbles and flow turbulence are excluded or broken up by the perforations, thus providing a smooth flow of coolant into slotted openings 47 and 49. Any gas that is entrained through the perforations will be accumulated at the top of annular space 63 where vent passageways 65 extend upwardly through the walls of receptacle 45 to bleed the gas into the low-pressure zone above grid plate 11.

One manner of removing the entrained gas is illustrated where an annular chamber 67 is defined around the top of vessel 43 just beneath vestibule 17 but above grid plate 11. A small circular space is left between vessel 43 and grid plate 11 at the point of penetration to permit gas from passageway 65 to bleed into chamber 67. A conduit branch 69 diverts coolant flow from vent conduit 53 into chamber 67 from which the vented gas is swept out into the low-pressure plenum through peripheral openings 71 within the outside walls of the chamber.

Figure 2:
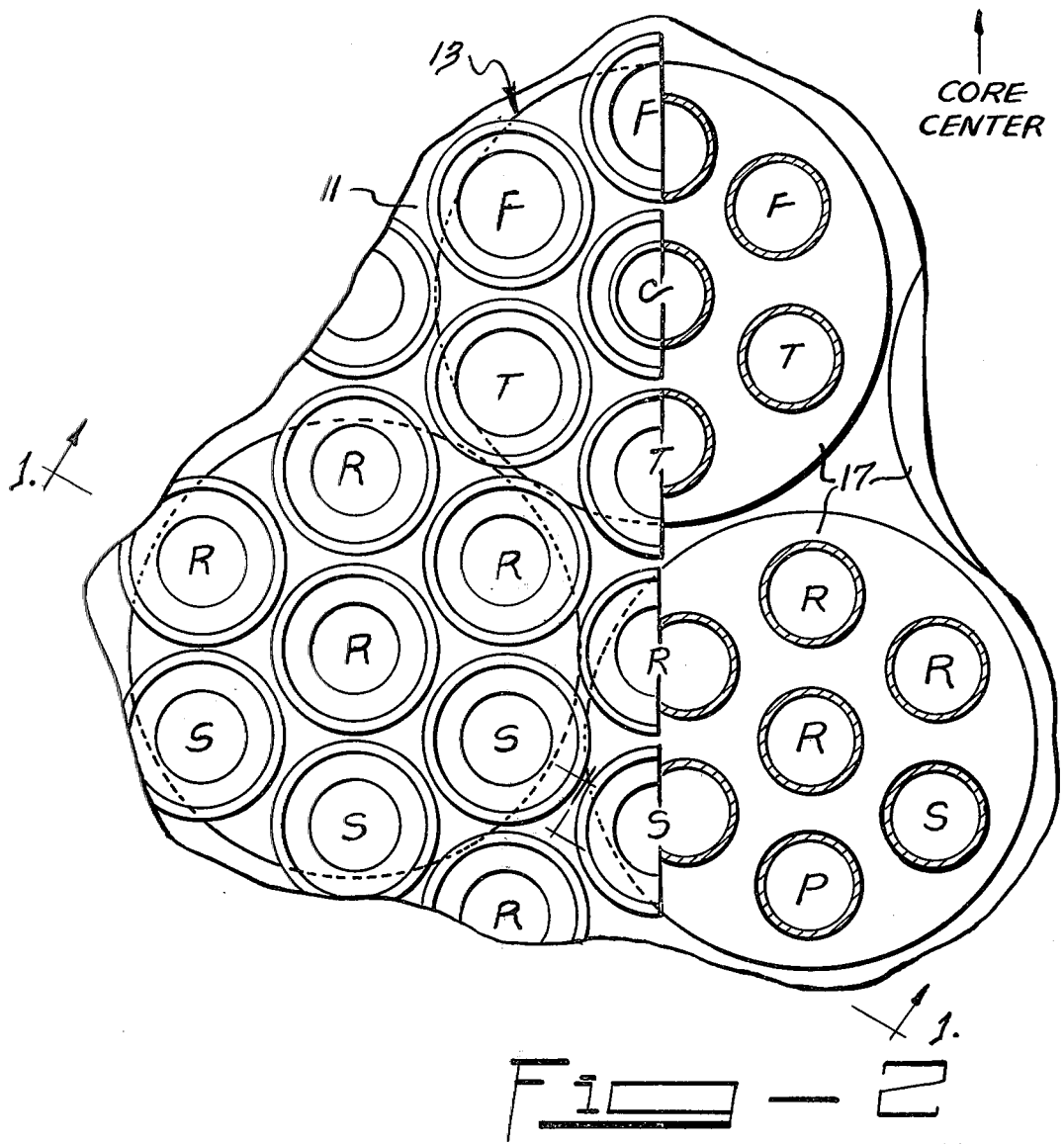
FIG. 2 is a cross-sectional view taken along line 2—2 of FIG. 1 but showing three modular units with core components symbolically illustrated.

Turning now in particular to FIG. 2 where a typical arrangement of core components within three support modules 13 is presented with the top of the drawing generally disposed towards the reactor core center and the lower portion towards the reactor periphery. The various components are represented symbolically with: F being a fuel element containing fissionable material, T being a target element containing fertile material for breeding additional fuel, C being a control rod containing neutron-absorbing material, R being a neutron reflector element, S being a structural member for providing radial restraint to the core or for shielding other members from neutron flux, and P being a passageway for test assemblies or a conduit for instrument access.

A support module can be designed to receive all or any lesser group of core components by providing appropriate socket members. The modules are interchangeable within the grid plate 11 for altering the reactor lattice pattern; individual components, however, cannot be switched between sockets to avoid inadvertent exchanges. It will be understood that various types of the above-listed components may be employed; for example a control rod can be a member containing neutron-absorbing material for quick or "scram" shutdown of a reactor as a safety measure or it may be for more precise reactor control.

From the foregoing, it can be seen that the present invention provides a nuclear reactor core assembly with interchangeable and replaceable core component modules for rearranging and servicing the reactor lattice. Each module is separately balanced in regard to upward hydraulic forces to prevent component expulsion. With this structure, different arrangements for varying the power output or for organizing various tests in particular portions of a reactor can be accommodated. Other more specific features include a primary meltdown crucible at the bottom of each module to contain molten radioactive material should control be lost. Also, stabilization of coolant flow is achieved with a perforated vortex suppressor at the module coolant inlet portion, while a coolant flow vestibule limits neutron-flux damage to the support grid.

The embodiments of the invention in which an exclusive property or privilege is claimed are defined as follows:

1. In a nuclear reactor core including a grid plate with openings therethrough separating zones of high and low coolant pressure, a plurality of receptacles depending from said grid plate into said high pressure coolant zone, each of said receptacles having side wall openings for admitting coolant flow and a top opening aligned with an opening through said grid plate, and core components requiring a coolant flow therethrough supported by said grid plate, the improved combination comprising a plurality of replaceable and interchangeable core component modules each having a coolant inlet portion disposed through an opening in said grid plate into a corresponding one of said receptacles, said coolant inlet portion having side wall openings alignable with said side wall openings in said corresponding receptacle; each module having a vestibule with an internal chamber defined by upper, lower and lateral walls disposed above said grid plate, said lower wall having an opening for admitting coolant flow and being joined to said coolant inlet portion; and each module having a plurality of elongated, vertical socket members connected to and above said vestibule, each of said socket members including an inner receptacle part adapted to receive and support one of said core components, said receptacle part having side wall openings for admitting coolant flow to said core component, and each of said socket members including an outer jacket spaced from and extending over the length of said receptacle part to define a coolant flow passageway to said side wall openings in said receptacle part, each of said outer jackets having a tubular neck at the lower end thereof connected into said upper vestibule wall at spaced apart locations and in communication with said vestibule internal chamber, said tubular necks being attached at peripheral and central locations on the surface of said upper vestibule wall and said tubular necks at said peripheral locations being axially offset on respective socket members and aligned inwardly toward the center of said upper vestibule wall surface to permit close assemblage of core components, said vestibule including said internal chamber for containing coolant, extending over and shielding said grid plate at locations beneath and intermediate said locations of tubular neck attachment from upwardly originating radiation.

2. The combination of claim 1 wherein in combination with said side wall openings within said receptacle part, there is provided orifice means within said tubular neck of each of said plurality of socket members for restricting coolant flow to said core component received within said receptacle part, included among said plurality of socket members are individual socket members having orifice means of different size than orifice means in other of said plurality of socket members to distribute coolant flow in different proportions to core components in said plurality of socket members.

3. The combination of claim 1 wherein said coolant inlet portion and said corresponding module receptacle are closely positioned at communicating lateral surfaces but spaced apart at lower surfaces to form a reservoir below said coolant inlet portion and wherein there are provided an annular chamber circumscribing each of said modules immediately above said grid plate but below said lower vestibule walls, an oblong sheath with perforations depending from said grid plate coaxially outside and spaced from said module receptacle to define an elongated, annular space therebetween, a passageway through the upper margin of said module receptacle from said elongated space below said grid plate to said annular chamber above said grid plate, and a vent tube interconnecting said annular chamber and reservoir below said coolant inlet portion, said annular chamber being vented to said zone of low coolant pressure to discharge coolant leakage flow from said reservoir with entrained gas from said elongated space, whereby each of said core component modules are hydraulically balanced within a corresponding module receptacle and trapped gas withdrawn from beneath said grid plate.

* * * * *